United States Patent [19]

Neiditch et al.

[11] 4,442,273

[45] Apr. 10, 1984

[54] PROCESS AND APPARATUS FOR CONTINUOUS POLYMERIZATION OF A MONOVINYL AROMATIC MONOMER

[75] Inventors: David S. Neiditch, Evansville, Ind.; Gerald A. Bullano, Glen Mills, Pa.; Robert J. DiLullo, Paoli, Pa.; David E. Ofstein, West Chester, Pa.

[73] Assignee: Atlantic Richfield Company, Los Angeles, Calif.

[21] Appl. No.: 482,391

[22] Filed: Apr. 6, 1983

[51] Int. Cl.$^3$ .............................................. C08F 2/06
[52] U.S. Cl. ..................................... 526/88; 422/134; 422/135; 422/138; 526/65
[58] Field of Search .............................. 526/65, 66, 85; 422/134, 135, 138

[56] References Cited

U.S. PATENT DOCUMENTS

| | | | |
|---|---|---|---|
| 3,262,922 | 7/1966 | Payne | 260/93.7 |
| 3,324,093 | 6/1967 | Alleman | 260/88.2 |
| 3,801,555 | 4/1974 | Johnson | 260/83.7 |
| 4,311,803 | 1/1982 | Smith et al. | 525/53 |

Primary Examiner—Paul R. Michl
Attorney, Agent, or Firm—Lewis J. Young

[57] ABSTRACT

A process and apparatus for the continuous polymerization of monovinyl aromatic monomers, such as styrene, to produce a substantially monodisperse polymer, wherein a solution of monomer in an inert solvent and a hydrocarbyllithium initiator are fed to the bottom zone of a sealed, cylindrical, pressurized, vertical reactor having a plurality of zones, with separation plates separating the reactor into a bottom, a plurality of intermediate, and top zones, the separation plates each having a central aperture, and a mixing means for each zone has a shaft extending through the apertures to provide an annular space for flow of fluid through the zones, the annular space between each separation plate and the shaft of the mixing means being of a size to provide a pressure differential between adjacent zones of less than about one pound per square inch, a substantially monodisperse polymer in solution discharged from the top zone of the reactor.

10 Claims, 4 Drawing Figures

PROCESS AND APPARATUS FOR CONTINUOUS POLYMERIZATION OF A MONOVINYL AROMATIC MONOMER

BACKGROUND OF THE INVENTION

This invention relates to a process for the continuous polymerization of a monovinyl aromatic monomer, such as styrene, in an inert solvent, and to an apparatus for such continuous polymerization. Specifically, a process and apparatus are provided which produce a substantially monodisperse polystyrene, i.e., production of a polystyrene which has a low ratio of Mw/Mn (weight-average molecular weight to number-average molecular weight).

It is known to anionically initiate batch polymerization of monovinyl aromatic monomers. Such batch processes, however, suffer the disadvantge of inefficient equipment utilization and batch-to-batch variations in product, for example by inadequate temperature control. A continuous process, on the other hand, eliminates such problems. In a continuous process, however, the apparatus and process steps must be designed for a narrow distribution of residence times. A broad residence time distribution would result in a polymer of broad molecular weight distribution, thus negating one of the principal advantages of anionic polymerization, namely the production of nearly monodisperse polymers.

One method for virtually eliminating residence time distribution is by use of a so-called plug flow reactor. However, for this system, the required length of such a reactor makes it impractical. A second approach is the use of many continuously stirred tank reactors in series. For the required narrow residence time distribution, the number of discrete reactors is far too large to be practical.

Examples of prior continuous polymerization include those described in U.S. Pat. Nos. 3,324,093, 3,262,922, 3,801,555 and 4,311,803. In U.S. Pat. No. 3,324,093, a tilted loop reactor is used for mass polymerization of propylene in the presence of liquid propylene as a diluent, with the effluent from the loop reactor passed to a contact tank, in which tank acetylacetone is admixed with the effluent. The tank has various zones with baffles separating the zones and stirring means in each zone to provide good contact between the acetylacetone and the effluent within the tank. In U.S. Pat. No. 3,262,922, a loop type reactor is used for the mass polymerization of an olefin, with the effluent passed to a treating zone where, as above, acetylacetone is mixed with the effluent. In U.S. Pat. No. 3,801,555, the mass polymerization of conjugated dienes is effected in a reaction vessel which may optionally contain a baffle with the monomer partially polymerized and then passed to a second vessel for further polymerization. In U.S. Pat. No. 4,311,803, a solution polymerization process uses a stirred reaction zone connected in series to a contiguous elongated tubular reaction zone.

In the present invention, a monovinyl aromatic monomer is polymerized in a single vertical reactor which is compartmented into zones and which prevents backmixing between zones. A sufficient number of compartments and elimination of such backmixing reduces the residence time distribution and, thus, the molecular weight distribution of the polymer produced.

SUMMARY OF THE INVENTION

A substantially monodisperse polymer similar to that produced by batch polymerization can be prepared by a continuous anionic polymerization process, using a continuous polymerization apparatus.

The present process, using a continuous polymerization reactor, involves continuously feeding a solution of a monovinyl aromatic monomer, such as styrene, in an inert solution, such as cyclohexane, and a hydrocarbyllithium catalyst to the bottom zone of a sealed, cylindrical, pressurized, vertical reactor. The mixture of reactants flows upwardly through a plurality of zones in the reactor to a top zone from which the product is discharged. Adjacent zones are separated from each other by separation plates having a central aperture therein, through which the shaft of a stirring means passes, with the mixture continuously passing from zone to zone through an annular space provided between the shaft and each of the separation plates. The annular space is so dimensioned to reduce backmixing by having the interstage or interzone velocity high relative to the superficial velocity and to provide a pressure differential of less than one pound per square inch between successive zones. The mixture within each zone is stirred by means of impellers carried by the shaft. Depending on the concentrations of reactants employed, the reactor may be run adiabatic or cooling can be applied individually to each zone by means of an external jacket heat exchanger or heat exchange loop which can be sized for the appropriate zone exotherm. The resultant polystyrene has a low weight average molecular weight to number-average molecular weight ratio indicating a substantially monodisperse polymer.

The continuous polymerization reactor is a sealed, cylindrical, pressurized, vertical reactor having a plurality of zones, with separation plates separating the reactor into bottom, plurality of intermediate, and top zones, the separation plates each having a central aperture, a mixing means for mixing fluid in each zone, and means for feeding reactants to the bottom zone and removing polymer from the top zone, with the flow of fluid from each zone to a successive zone effected through an annular space between each separation plate and the shaft of the mixer, the annular space being of a size to provide a pressure differential between adjacent zones to less than about one pound per square inch.

DETAILED DESCRIPTION

According to the present process, a monovinyl aromatic compound is continuously polymerized, using anionic initiation, in a manner which produces a substantially monodisperse polymer.

The monovinyl aromatic compound useful in the invention is preferably styrene, but may be alkyl substituted styrenes which have similar copolymerization characteristics, such as alphamethylstyrene and the ring substituted methylstyrenes, ethylstyrenes and t-butylstyrene. Because styrene is the preferred monovinyl aromatic compound, it will be used in the following description; but it should be noted that other monovinyl aromatic monomers are also polymerizable by the present process and using the present apparatus.

Figure 1:
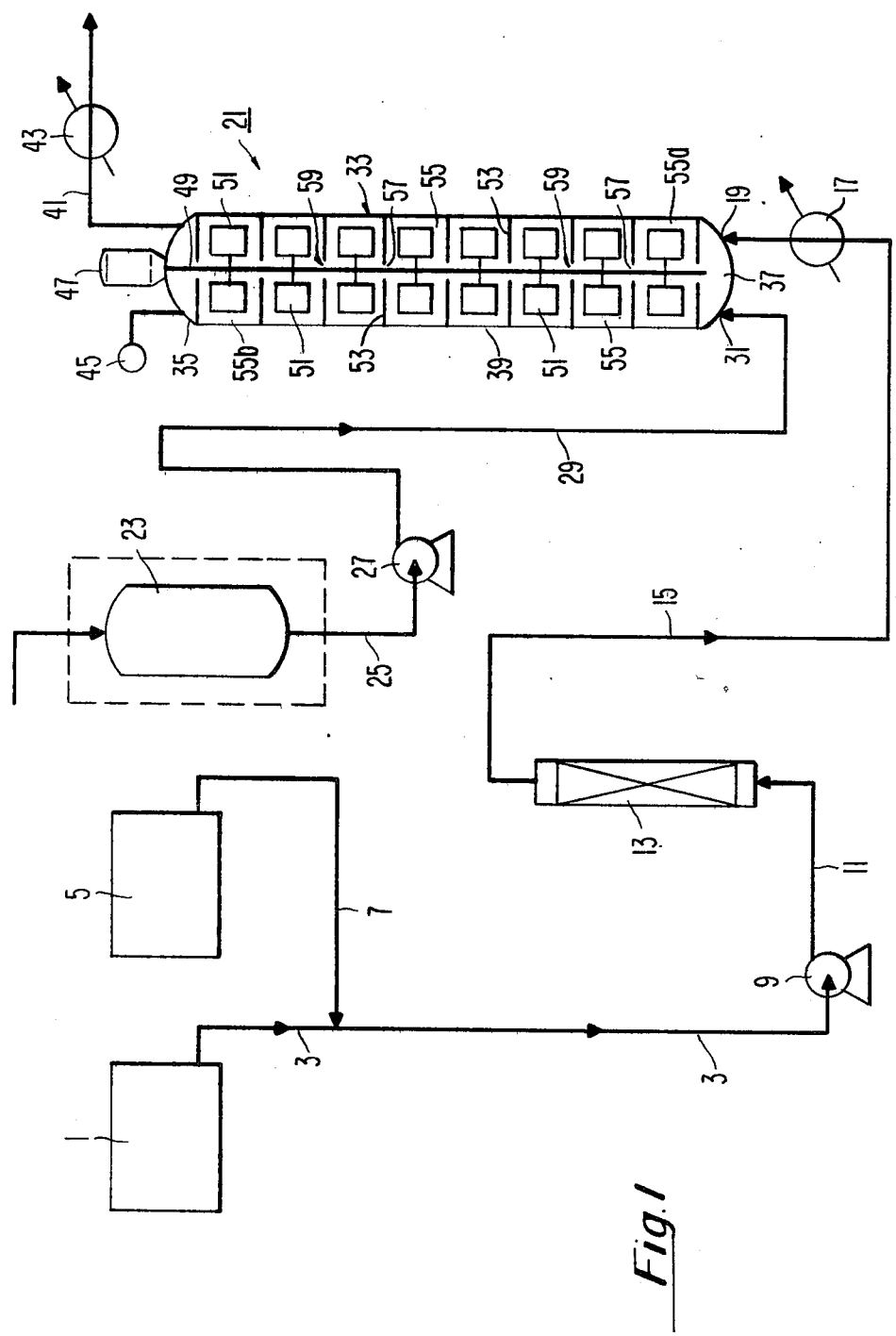
FIG. 1 is a schematic flow chart illustrating the continuous polymerization process of the present invention.

Referring to FIG. 1, styrene monomer from a source 1, is passed through line 3, while an inert solvent from a source 5 is passed through line 7 and enters line 3 for admixture with the styrene. The inert solvent is an inert hydrocarbon solvent, such as isobutane, pentane, cyclohexane, benzene, toluene, xylene, or the like, with cyclohexane, which will be used in the following description, being preferred. The solution formed by admixture of the styrene and cyclohexane flows through a pump 9, thence through line 11 to a purification system 13 such as a filter, dryer and other purification means. The solution is then passed through line 15, through a preheater 17, and to an inlet 19 into the bottom of a continuous polymerizer 21. A source of hydrocarbyllithium initiator for the polymerization of a monovinyl aromatic monomer, such as styrene, is prepared as a cold solution in an inert hydrocarbon solvent at 23. The hydrocarbyllithium initiators useful in the invention are the known alkyllithium compounds, such as methyllithium, n-butyllithium, secbutyllithium; the cycloalkyllithium compounds, such as cyclohexyllithium; and the aryllithium compounds, such as phenyllithium, p-tolyllithium and naphthyllithium. The solution of the hydrocarbyllithium initiator is passed through line 25, and by a pump 27 through line 29 and is charged through inlet 31 into the bottom of the continuous polymerizer 21. The amount of hydrocarbyllithium initiator added should be between 0.05 and 2.0 millimoles per mole of monomer. The specific amount will depend upon the molecular weight of the monomer and polymer desired.

As illustrated, the polymerization reactor 21 comprises a sealed, cylindrical, pressurized, vertical vessel 33 having a top 35, bottom 37, and walls 39. The bottom 37 has the inlets 31 and 19 therein for admission to the vessel of a catalyst and a styrene-solvent premix, respectively. The top 35 has an outlet 41 for product from the reactor, which product is cooled by flow through a heat exchanger unit 43, and the top also has a pressure relief valve 45. A mixing means is provided which comprises a motor 47, shaft 49 and spaced impellers 51.

Figure 2:
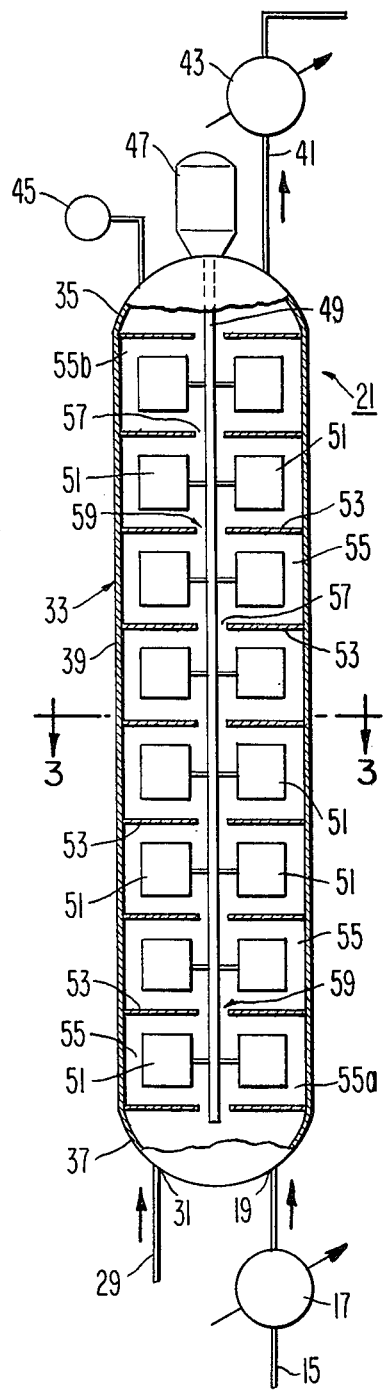
FIG. 2 is a schematic representation of the continuous polymerization reactor of the present invention used in the continuous polymerization process.
Figure 3:
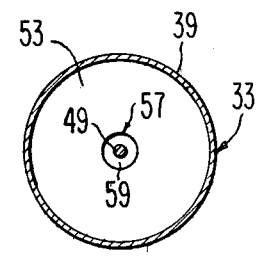
FIG. 3 is a view taken along lines III—III of FIG. 2.
Figure 4:
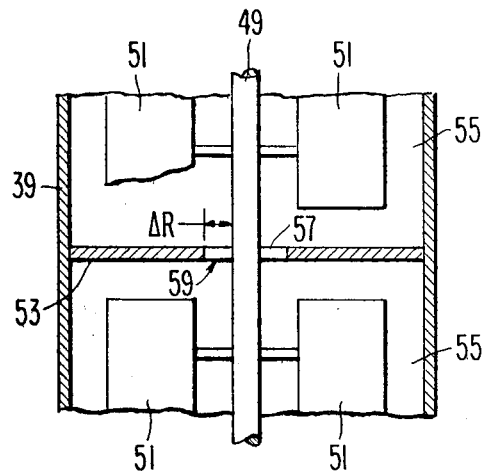
FIG. 4 is an enlarged cross-sectional view showing one of the separation plates, a portion of the shaft of the mixer and the relationship thereof, between successive zones of the polymerization reactor illustrated in FIG. 2.

The reactor, as illustrated in FIG. 2, has a series of separation plates 53 which subdivide the reactor into a series of zones 55 including a bottom zone 55a and top zone 55b, as well as a plurality of intermediate zones. Each of the separation plates 53 has a central aperture 57 therethrough, through which the shaft 49 of the stirring means passes and forms an annular space 59 between each separation plate 53 and the shaft 49.

The number of zones required, which will also determine the number of separation plates present, in the anionic polymerization of styrene is determined by the degree of polydispersity desired in the product. In order to approach the polydispersity, defined as Mw/Mn, of batch reacted polystyrene, the number of intermediate zones should be eight or more. The total number of stages would be limited by the economic trade-off of the asymtotic approach to batch polydispersity which enhances polymer performance versus the cost of the additional stages.

The ratio of height to diameter of each of the intermediate zones 55 is preferably a ratio approximating 1:1. By use of such a ratio, wherein the interior diameter of the reactor 1 for each zone approximates the distance between a pair of separation plates 53 forming a zone 55, the reactor is of manageable dimensions. Thus, with the use of eight zones, the height to diameter ratio of the reactor, using interior dimensions and excluding the separation plates, would be about 8:1.

In order to obtain flow of the reactants between zones, so as to achieve the desired polydispersity, the separation plates 53 must be so constructed as to provide an annular space 59 between the walls of the aperture 57 and the shaft 49 of a particular size. The size of the annular space 59 should be such as to provide a pressure differential of less than one pound per square inch between adjacent zones. By providing such an annular space, backmixing is minimized by high interstage velocity relative to reactor superficial velocity while the pressure differential is calculable and controllable.

The styrene-inert solvent solution is preheated in the preheater 17 to a temperature of between 65°–100° C., preferably 70°–80° C., and the temperature of the reactants in the reactor 21 is maintained at a temperature of 70°–100° C. during reaction in, and passage through, the reactor. The source of hydrocarbyllithium initiator-inert solvent solution is preferably under refrigeration to maintain that solution below ambient temperatures while the solution may be increased to ambient temperature during passage to and introduction into the reactor.

The residence time in the reactor should be sufficient to allow essentially complete polymerization of the styrene to form linear chains thereof having lithium ions at the ends of the chains. Conversions of greater than 99 percent have been achieved of substantially monodisperse polystyrenes. After discharge from the reactor, the polymer is cooled and the termination of the polymeric chains is effected by known means.

As an example of the apparatus of the present invention, a continuous styrene polymerization reactor would have eight zones, with the interior diameter of the vessel being about 1.8 feet, while the length of the reactor, excluding separation plates, would be about 14.5 feet. The central aperture in the separation plates, which would divide the reactor into zones, would be such that with the shaft of the stirring means, an annular space is provided such that flow from each of the zones to a zone above is effected while providing a pressure differential of less than one pound per square inch between adjacent zones. Experimental results with continuous polymerization of styrene monomer in cyclohexane, using sec-butyllithium, in an eight-stage reactor has yielded polystyrenes with a polydispersity ($\overline{Mw}/\overline{Mn}$) ranging from 1.3 to 1.8 compared with a typical value of 1.2 for batch polymerizations (1.0 being the theoretical limit for anionic polymerization). In the reactor used, the pressure differential between successive zones was less than 1 psi. A specific example of the operation of the process and apparatus follows:

A run was carried out using the present invention to polymerize styrene using sec-butyllithium initiator. The overall reactor size was 59.5 cm long and 6.02 cm in diameter and had 8 stages. The total reactor volume was about 1500 cm³. Each stage had twin, two-bladed agitators positioned at 2.2 and 4.4 cm from the bottom of the stage separation plates.

In this run, 10.9 g/min of styrene was admixed with cyclohexane to result in a 10 weight percent styrene solution, and a volumetric flowrate of 125 ml/min. This premix was pumped through purification columns to remove moisture and inhibitors and then heated to 70° C. before entering the first stage at the reactor bottom inlet 19, FIG. 1. The initiator was diluted with cyclohexane to a 0.33 molar solution and placed in a subambient cooled vessel, 23, to prevent deactivation. The initiator was then pumped from storage vessel, 23, at 2.4 ml/min and fed directly to the first stage at reactor bottom inlet 31. The two streams were mixed in the first stage and began to react immediately. The mean residence time was 11.8 minutes after which the polymer/solvent solution exited the reactor at the top outlet, 41, and was cooled to room temperature. At this molar ratio of initiator to styrene, the polystyrene molecular weight was 28,000 as measured by gelpermeation chromatography. Theoretical conversions for each stage are shown in Table 1. A measured overall conversion of greater than 99% was achieved with a polydispersity of 1.4.

TABLE 1
THEORETICAL CONVERSIONS CALCULATED AT ACTUAL OPERATING TEMPERATURES

Solids of Premix = 10.00 weight percent
Diameter of Reactor = 6.020 cm
Total Reactor Length (including stages) = 59.47 cm
Inlet Flow:
125.00 ml/min Cyclohexane/Styrene Premix
1.88 ml/min sec-butyllithium
Assumes 2.7 × $10^{-4}$ moles/min Impurities in Premix
(Initiator Molarity = 0.33 moles/liters)
Outlet Flow:
126.88 ml/min Total
Polystyrene molecular weight produced = 28000
Total mean residence time = 11.8 min. (8 stages × 1.48 min)

| Stage | Actual Temp(°C.) | Theoretical [S]in Moles/Liter | [S]out Moles/Liter | Conversion |
|---|---|---|---|---|
| 1 | 83.3 | 0.7473 | 0.1946 | 0.7396 |
| 2 | 86.7 | 0.1946 | 0.0432 | 0.9421 |
| 3 | 87.8 | 0.0432 | 0.0091 | 0.9878 |
| 4 | 87.8 | 0.0091 | 0.0019 | 0.9974 |
| 5 | 88.9 | 0.0019 | 0.0004 | 0.9995 |
| 6 | 88.3 | 0.0004 | 0.0001 | 0.9999 |
| 7 | 87.2 | 0.0001 | 0.0000 | 1.0000 |
| 8 | 83.3 | 0.0000 | 0.0000 | 1.0000 |

The present process and apparatus thus provide for the continuous anionic polymerization of a monovinyl aromatic monomer to produce substantially monodisperse polymers approaching those produced by batch polymerization.

What is claimed is:

1. The process for continuous anionic solution polymerization of a monovinyl aromatic monomer to produce a polymer having a low weight average molecular weight to number average molecular weight ratio, comprising:
   continuously feeding a solution of a monovinyl aromatic monomer in an inert solvent, and a hydrocarbyllithium initiator in an inert solvent, to form a mixture in the bottom zone of a sealed, cylindrical, pressurized, vertical reactor having a bottom zone, a top zone, and a plurality of intermediate zones, each said zone separated from an adjacent zone by separation plates having a central aperture therethrough, and stirring means carried by a central shaft passing through said apertures with an annular space provided between the shaft and each said separation plate;
   continuously passing said mixture from the bottom zone to successive zones through the annular space between the shaft and each said separation plate, said annular space being dimensioned so as to provide a high interstage velocity relative to superficial velocity and pressure differential of less than one pound per square inch between said successive zones;
   stirring said mixture while passing the same through each zone; and cooling the reaction if necessary by means of a zoned-jacket or pumparound loop for each zone; and
   continuously removing a solution of polymer from the top zone.

2. The process as defined in claim 1 wherein said monovinyl aromatic monomer is selected from the group consisting of styrene and alkyl substituted styrenes.

3. The process as defined in claim 2 wherein said monovinyl aromatic monomer is styrene.

4. The process as defined in claim 3 wherein said hydrocarbyllithium initiator is sec-butyllithium.

5. The process as defined in claim 1 wherein the monovinyl aromatic monomer in inert solvent is preheated to a temperature of between 65°–100° C. for introduction into the bottom zone.

6. The process as defined in claim 1 wherein said mixture in the reactor is maintained at a temperature of 70°–100° C.

7. The process as defined in claim 1 wherein said mixture is continuously passed through at least eight zones within the reactor.

8. The process as defined in claim 1 wherein said inert solvent is selected from the group consisting of isopentane, pentane, cyclopentane, cyclohexane, benzene, toluene, xylene, and mixtures thereof.

9. The process for continuous anionic solution polymerization of styrene to produce polystyrene having a low weight average molecular weight to number average molecular ratio, comprising:
   continuously feeding a preheated solution of styrene in an inert solvent, and a hydrocarbyllithium initiator in an inert solvent, to form a mixture in the bottom zone of a sealed, cylindrical, pressurized, vertical reactor having a bottom zone, a top zone, and at least eight intermediate zones, each said zone separated from an adjacent zone by separation plates having a central aperture therethrough, and stirring means carried by a central shaft passing through said apertures with an annular space provided between the shaft and each said separation plate;
   continuously passing said mixture from the bottom zone to successive zones through the annular space between the shaft and each said separation plate, said annular space being dimensioned so as to provide a pressure differential of less than one pound per square inch between said successive zones;
   stirring said mixture while passing the same through each zone;
   maintaining said mixture at a temperature of between 70°–100° C. during passage through said zones; and
   continuously removing a solution of polystyrene from the top zone.

10. The process as defined in claim 9 wherein said inert solvent is cyclohexane and said hydrocarbyllithium initiator is sec-butyllithium.

* * * * *